(12) United States Patent
Gritti

(10) Patent No.: US 9,159,208 B2
(45) Date of Patent: Oct. 13, 2015

(54) ENERGY EFFICIENT CASCADE OF SENSORS FOR AUTOMATIC PRESENCE DETECTION

(75) Inventor: Tommaso Gritti, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 636 days.

(21) Appl. No.: 13/260,586

(22) PCT Filed: Mar. 24, 2010

(86) PCT No.: PCT/IB2010/051268
§ 371 (c)(1),
(2), (4) Date: Dec. 20, 2011

(87) PCT Pub. No.: WO2010/113075
PCT Pub. Date: Oct. 7, 2010

(65) Prior Publication Data
US 2012/0105193 A1  May 3, 2012

(30) Foreign Application Priority Data
Mar. 31, 2009 (EP) .................................... 09156794

(51) Int. Cl.
*G08B 21/00* (2006.01)
*G08B 13/00* (2006.01)
(Continued)

(52) U.S. Cl.
CPC .......... *G08B 13/00* (2013.01); *G08B 13/19695* (2013.01); *G08B 29/188* (2013.01); *H05B 37/0227* (2013.01); *Y02B 20/44* (2013.01)

(58) Field of Classification Search
CPC ....................................................... G08B 13/00
USPC ........... 340/3.4, 541, 551–567; 382/190, 224; 348/159
See application file for complete search history.

(56) References Cited

U.S. PATENT DOCUMENTS 5,909,378 A  6/1999 DeMilleville
6,522,078 B1  2/2003 Okamoto et al.
(Continued)

FOREIGN PATENT DOCUMENTS

CN  2466330 Y  12/2001
GB  2250156 A  5/1992
(Continued)

*Primary Examiner* — Mark Rushing
(74) *Attorney, Agent, or Firm* — Meenakshy Chakravorty

(57) ABSTRACT

The present invention relates to a method and a system for detecting presence in a predefined space. The system comprises cascade connected sensors ($s_1, s_2, \ldots, s_n$), an output device (1), a control unit (2) and a processing unit (3). The method comprises the steps of activating a first sensor ($s_1$) in the cascade and waiting until the first sensor detects presence. When presence is detected, a successive sensor ($s_2, \ldots, s_n$) in the cascade is activated, and when the successive sensor ($s_2, \ldots, s_n$) also detects presence the step of activating the successive sensor is repeated until all sensors in the cascade have been activated. If the successive sensor ($s_2, \ldots, s_n$) does not detect presence the method returns to the waiting step of the first sensor. When the ultimate sensor in the cascade ($s_n$) detects presence, a confirmation message is sent to the output device (1).

8 Claims, 4 Drawing Sheets

(51) Int. Cl.
  *G08B 13/196*     (2006.01)
  *G08B 29/18*      (2006.01)
  *H05B 37/02*      (2006.01)

(56) References Cited

U.S. PATENT DOCUMENTS

| | | | |
|---|---|---|---|
| 6,822,568 B2* | 11/2004 | Gehlot et al. | 340/572.1 |
| 2004/0021568 A1* | 2/2004 | Seal et al. | 340/551 |
| 2005/0030376 A1 | 2/2005 | Terada et al. | |
| 2005/0200480 A1 | 9/2005 | Caras et al. | |
| 2007/0003146 A1 | 1/2007 | Ko et al. | |
| 2008/0211668 A1 | 9/2008 | Dixon et al. | |
| 2008/0288023 A1 | 11/2008 | John | |
| 2009/0289793 A1* | 11/2009 | Morin | 340/572.1 |
| 2011/0128383 A1* | 6/2011 | Sugimoto et al. | 348/159 |

FOREIGN PATENT DOCUMENTS

| | | |
|---|---|---|
| JP | 2000076521 A | 3/2000 |
| JP | 2001118161 A | 4/2001 |
| JP | 2004220224 A | 8/2004 |
| WO | 2008008503 A2 | 1/2008 |

\* cited by examiner

ENERGY EFFICIENT CASCADE OF SENSORS FOR AUTOMATIC PRESENCE DETECTION

TECHNICAL FIELD

The present invention relates generally to a method and a system for detecting presence, and more specifically to a system of cascade connected sensors, that minimize the energy consumption while maintaining high detection accuracy.

BACKGROUND OF THE INVENTION

Automatic presence detection is available for different purposes, such as building control, lighting adjustment or heating control, surveillance systems, burglar alarms, personal safety systems or car parking aids.

Even though accuracy is important for all these applications, different aspects of accuracy are important, and for different reasons. For a car parking aid, a false negative reading may lead to damage to your car, while a false positive reading is probably only a minor nuisance. A false positive reading in a personal safety system on the contrary, may lead to people being terrified. Repeated false positive readings in a surveillance system might have a "cry wolf" effect on a security officer assigned to investigate the surveyed area, leading to future true readings being ignored. False positive readings triggering heating or lighting systems will increase power consumption significantly. Most of the time these false readings have natural causes, but sometimes the functioning of the sensor is deliberately tampered with. Some applications are especially prone to tampering, e.g. surveillance or burglary alarms, and therefore it is desirable that sensors used in such applications be difficult to manipulate.

Different kinds of sensors are available for detecting presence. They are based on different physical principles, have different power requirements and have different strengths in terms of accuracy.

One of the most common approaches to detect presence is to use infrared detectors. A beam of IR light is emitted against a sensor, and the sensor will very accurately detect when the beam is being broken. Such sensors are often used e.g. in shop entrances, i.e. fairly narrow and confined passages. Detecting presence in a distributed space with a system based on this kind of IR sensors requires a multitude of beams to avoid the problem of false negative reading, where e.g. a burglar simply walks around, over or under the beams without breaking them.

Therefore presence detectors based on this technology are difficult to implement, unpractical, and power consuming, because of the power demands of the multitude of emitted IR light beams. In addition the system will register any object breaking a beam, and cannot distinguish a dead object from a human being. Used as a human presence detector, the IR beam detector will cause a high rate of false positive readings.

A Passive InfraRed detector (PID) however, uses the fact that all objects emit black body radiation, in practice infrared radiation, which is invisible to the human eye, but which can be detected by electronic devices designed for such a purpose. A PID measures IR light radiating from objects in its field of view. Apparent motion is detected when an infrared source with one temperature, such as a human, passes in front of an infrared source with another temperature, such as a wall.

The term passive in this instance means that the PID device does not emit an infrared beam but merely passively accepts incoming infrared radiation. Therefore it is significantly less power consuming than the active infra-red detector described above. However, a PID based system will potentially give an indication based on anything moving within its field of view, i.e. a high rate of false positive readings. Usually, a PID cannot distinguish between a human and other moving objects with any accuracy; if a moving object stops, and becomes immobile, the PID may lose track of it. Lastly, continuous bright light can saturate a PID sensor and render it unable to register further information. This feature makes it less reliable as a presence detector outdoors, and makes it relatively easy to manipulate.

Other approaches to detecting presence of humans include ultrasonic sensors.

Ultrasonic sensors work according to a principle similar to sonar and evaluate attributes of a target by interpreting the echoes from signals previously sent out. The time intervals between sending the signals and receiving the echoes is calculated and is then used to determine the distance to, and velocity of an object. The ultrasonic sensor is less good at detecting immobile objects. Further, an ultrasonic sensor based system may be prone to manipulation, because of the fact that surface shape, density or consistency of material covering an object can muffle the echo sufficiently to render the object invisible to the ultrasonic sensor.

A more accurate presence detection will require more complex methods, such as e.g.

audio or video analysis. Video analysis not only allows distinguishing between human beings and objects, but also allows distinguishing between individuals, as well as and tracking them, and detecting movements and activities. Another advantage of using a video camera is that immobile individuals can be detected. Audio analysis, where a microphone records sounds in the room and an algorithm trained to recognize typical sound patterns can be used to distinguish between different activities.

Audio/video scene analysis is a very complex process. In order to achieve robustness, algorithms have to be computationally demanding. The average power consumption needed to run such algorithms on a chip continuously is substantial.

As can be seen in the above examples, high accuracy typically comes with high power consumption. Thus there is a need for a presence detection system that maintains power consumption, while obtaining high detection accuracy.

SUMMARY OF THE INVENTION

Accordingly, the present invention preferably seeks to mitigate, alleviate or eliminate one or more of the above-identified deficiencies in the art and disadvantages singly or in any combination and solves at least the above-mentioned problems by providing a method, and a system according to the appended patent claims.

A problem to be solved with the present invention is to create a method and a system that maintains a low overall power consumption while obtaining high accuracy through reducing both the number of false negative and false positive readings.

According to one aspect of the invention the problem is solved by connecting in cascade different kinds of sensors, and then only gradually activating a more accurate and more power consuming sensor, when simpler sensors have indicated presence, exploiting the information obtained by these sensors to decide whether further, even more power consuming analysis is requested, thereby keeping the overall power consumption of the presence detection system at a low level.

Another aspect of the invention is to further reduce the overall power consumption by deactivating each intermediate sensor as a more accurate sensor is activated.

Another aspect of the invention is to further reduce the number of false negative readings by activating the ultimate sensor in the cascade randomly or periodically, even if the preceding sensor has not detected presence.

Another aspect of the invention is to enable activity analysis of the detected object or person by activating a post-detection sensor, gathering information collected by the post-detection sensor, processing the gathered information and sending activity messages to an output device.

BRIEF DESCRIPTION OF THE DRAWINGS

The present invention, as defined in the claims, can be better understood with reference to the following drawings. The components within the drawings are not necessarily to scale relative to each other, emphasis instead being placed upon clearly illustrating the principles of the present invention.

DETAILED DESCRIPTION OF EMBODIMENTS

The invention to be described hereafter is applicable to presence detection, and more specifically to a system of cascade connected sensors, which minimizes the power consumption while maintaining a high detection accuracy.

Several embodiments of the present invention will be described in more detail below with reference to the accompanying drawings in order for those skilled in the art to be able to carry out the invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. The embodiments do not limit the invention, but the invention is only limited by the appended patent claims. Furthermore, the terminology used in the detailed description of the particular embodiments illustrated in the accompanying drawings is not intended to be limiting of the invention.

Figure 1:
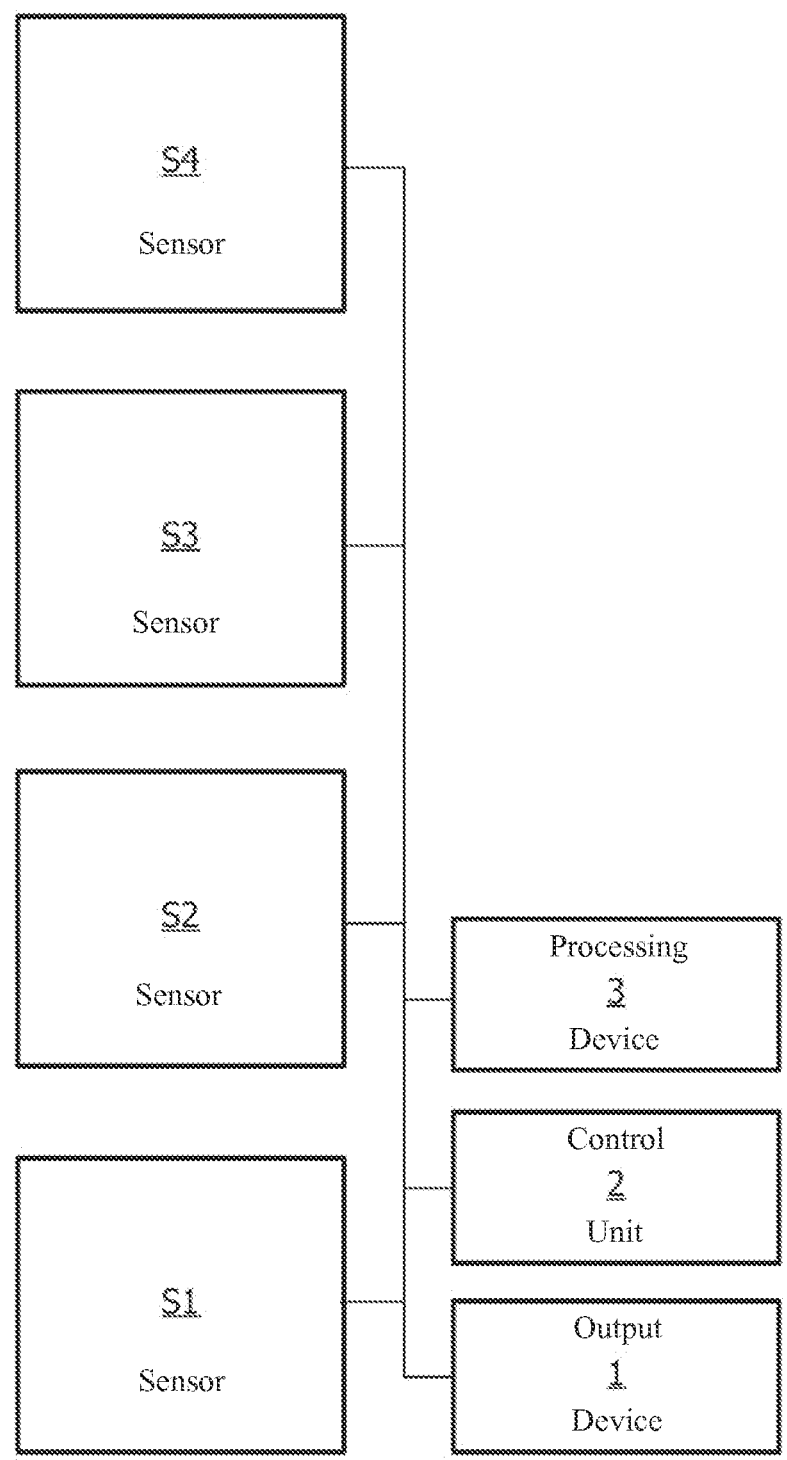
FIG. 1 is a schematic drawing of the presence detection system.

The system as laid out in FIG. 1 comprises four sensors $s_1$, $s_2$, $s_3$, $s_4$. Further it comprises an output device 1, a control unit 2 and a processing device 3.

In a first preferred embodiment of the system, three sensors $s_1$, $s_2$, $s_3$ are connected in cascade, and the control unit 2 is connected to each of the sensors.

The first sensor $s_1$ comprises a Passive Infrared Detector (PID) for detecting motion. The PID $s_1$ cannot detect the distance to the detected object, but only that there is activity somewhere within its sensitive range. The PID $s_1$ is always activated, but since PIDs $s_1$ operate without first emitting infrared light, this adds only very little to the overall power consumption. Occasionally the PID $s_1$ may give a false positive reading, due to e.g. incident sunlight. The low power consumption also redeems the PIDs $s_1$ relatively low accuracy.

The second sensor $s_2$ comprises an ultrasonic sensor, which remains deactivated until the first sensor $s_1$ indicates presence to the control unit 2 and the control unit 2 in turn gives the ultrasonic sensor $s_2$ an instruction to activate. The ultrasonic sensor $s_2$ does consume slightly more power than the PID $s_1$, but in return it provides a more accurate presence detection. For instance, the ultrasonic sensor is not sensitive to incident sunlight, which means this aspect of the previous sensors weakness is compensated. In case the ultrasonic sensor $s_2$ does not detect presence, the control unit 2 deactivates it again.

If the ultrasonic sensor $s_2$ seconds the PIDs $s_1$ detection and the detected object is within a predefined distance, the control unit 2 instructs the third sensor $s_3$, comprising a video camera, to activate, and at the same time instructs the ultrasonic sensor $s_2$ to deactivate. The video signal is analyzed using processing means comprised in the processing unit 3, and if it is verified that the moving object is a human being, the control unit 2 sends a confirmation message to the output device 1, which can be a computer screen, a sounding horn or a triggering device designed to activate another system e.g. a building control system or a lighting, heating or media system.

In another embodiment the video camera $s_3$ continues to collect post-detection information, even after the confirmation message has been sent, and the processing unit 3 continues to process the information to deduct what type of activity is going on. Activity messages are then sent to the output device 1. Recently, sensors capable of acquiring simultaneously both an image and its depth, in real-time, have been developed. A Time Of Flight camera (TOF) is such a sensor, which illuminates the scene with a number of IR Light Emitting Diodes (LEDs), pulsating at a known frequency, and captures the illuminated scene with a camera sensible to IR light. Given the optical correlation of the signal emitted by the LEDs and the signal captured by the camera in every pixel, it is possible to compute the distance from the camera of the scene captured by the sensor.

Structured light scanning gives similar results. If a known pattern of light is projected onto an object, which is at the same time captured by a video camera, it is possible to obtain the depth of the acquired image by using a known spatial distribution. These methods can be used for real-time face recognition and identification. The drawback of these sensors is, once again, the large power consumption.

In yet another embodiment an audio sensor $s_{n+1}$ comprising a microphone is connected to the system, for post-detection use. The audio sensor $s_{n+1}$ is activated as the control unit 2 sends the confirmation message, and by combined audio/video analysis in the processing unit 3, additional information can be obtained about the detected person, such as e.g. type of activity, properties and identity of the human being.

In yet another embodiment the control unit 2 intermittently instructs the third sensor $s_3$, comprising a video camera, to activate, even though the second sensor $s_2$, comprising the ultrasonic sensor, has not previously detected presence. This is to verify that a supposedly empty predefined space is truly empty. This type of recurrent activation can be made periodically or randomly. This mitigates previous sensors' limited ability to e.g. detect stationary objects or other false readings, but also in general reduces impact of other sources of error such as malfunction or manipulation. In other versions of this embodiment another sensor out of sensors ($s_2$, . . . $s_n$) is activated recurrently Common for all these embodiments is that the sensors comprised in the system should be placed according to power consumption. Thus, even if the present description describes that the PID is the first sensor and the ultrasonic sensor is the second sensor it should be understood that depending on the future development of sensors it may in the future be the other way around. However, attention should also be paid to the strengths and weaknesses of the individual sensors. If two kinds of sensors have a power consumption that fits a certain level of the cascade, then the sensor that can supplement strengths or compensate weaknesses of other sensors comprised in the cascade should be chosen. Through this combination of use of multiple sensors and the particular configuration of the cascade in which they are arranged, the number of correct detections can be maximized while the power consumption is minimized.

The invention may be implemented in any suitable form including hardware, software, firmware or any combination of these. The elements and components of an embodiment of the invention may be physically, functionally and logically implemented in any suitable way. Indeed, the functionality may be implemented in a single unit, in a plurality of units or as part of other functional units. As such, the invention may be implemented in a single unit, or may be physically and functionally distributed between different units and processors.

Figure 2:
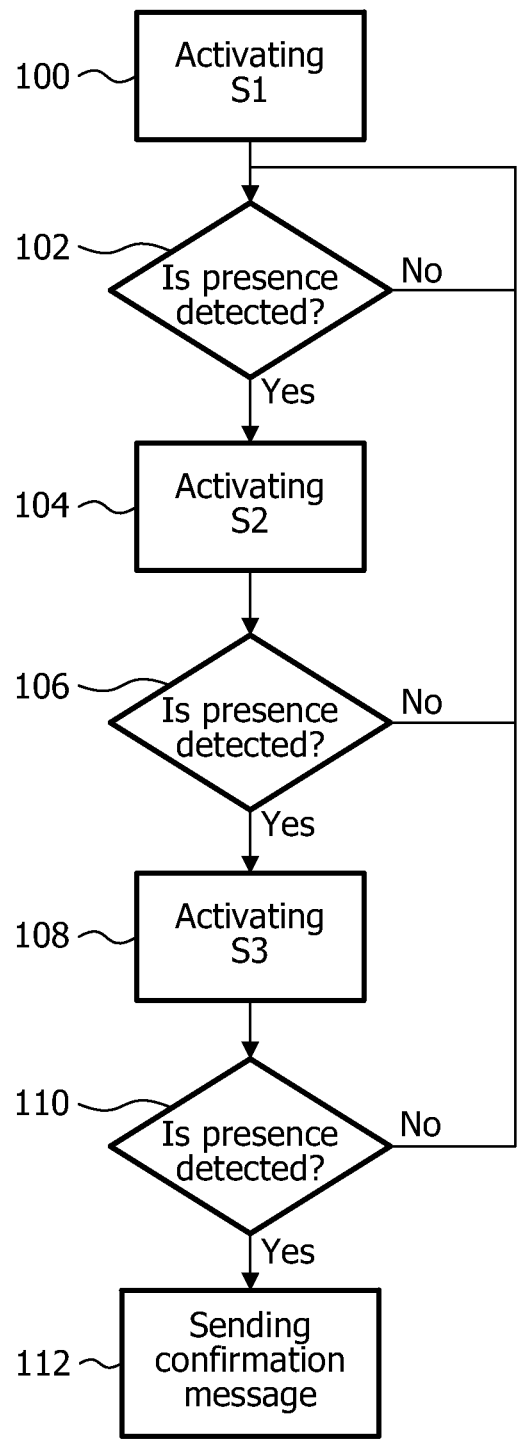
FIG. 2 is a flow chart illustrating the method of the present invention.

FIG. 2 is a flow chart illustrating a first embodiment of the method according to the present invention. In a first step 100 the control unit 2 depicted in FIG. 1 activates the first sensor $s_1$. Thereafter, the control unit 2, in step 102, waits for the first sensor $s_1$ to detect presence. If presence is detected, the control unit 2 activates the second sensor $s_2$ in step 104. If the first sensor $s_1$ does not detect presence it will keep waiting until it does. Thereafter, in step 106, the control unit 2 waits a predetermined time for the second sensor $s_2$ to detect presence. The predetermined time is set such that it is sufficiently long for the second sensor $s_2$ to make a proper scanning. If no detection is made by the second sensor $s_2$ within that predetermined time, the control unit 2 returns to step 102.

However, if the second sensor $s_2$ confirms the first sensor's $s_1$ detection, the control unit 2 will activate the third sensor $s_3$ in step 108. In step 110, the control unit 2 waits a predetermined time until the third sensor $s_3$ has made a proper scanning. If no detection is made within that predetermined time, the control unit 2 returns to step 102. However, if the third sensor $s_3$ has made a detection, the control unit 2, in step 112 sends a confirmation message to the output device 1. The confirmation message may be a message on a display, a sound message or some other means that confirms detection to a user of the system.

Figure 3:
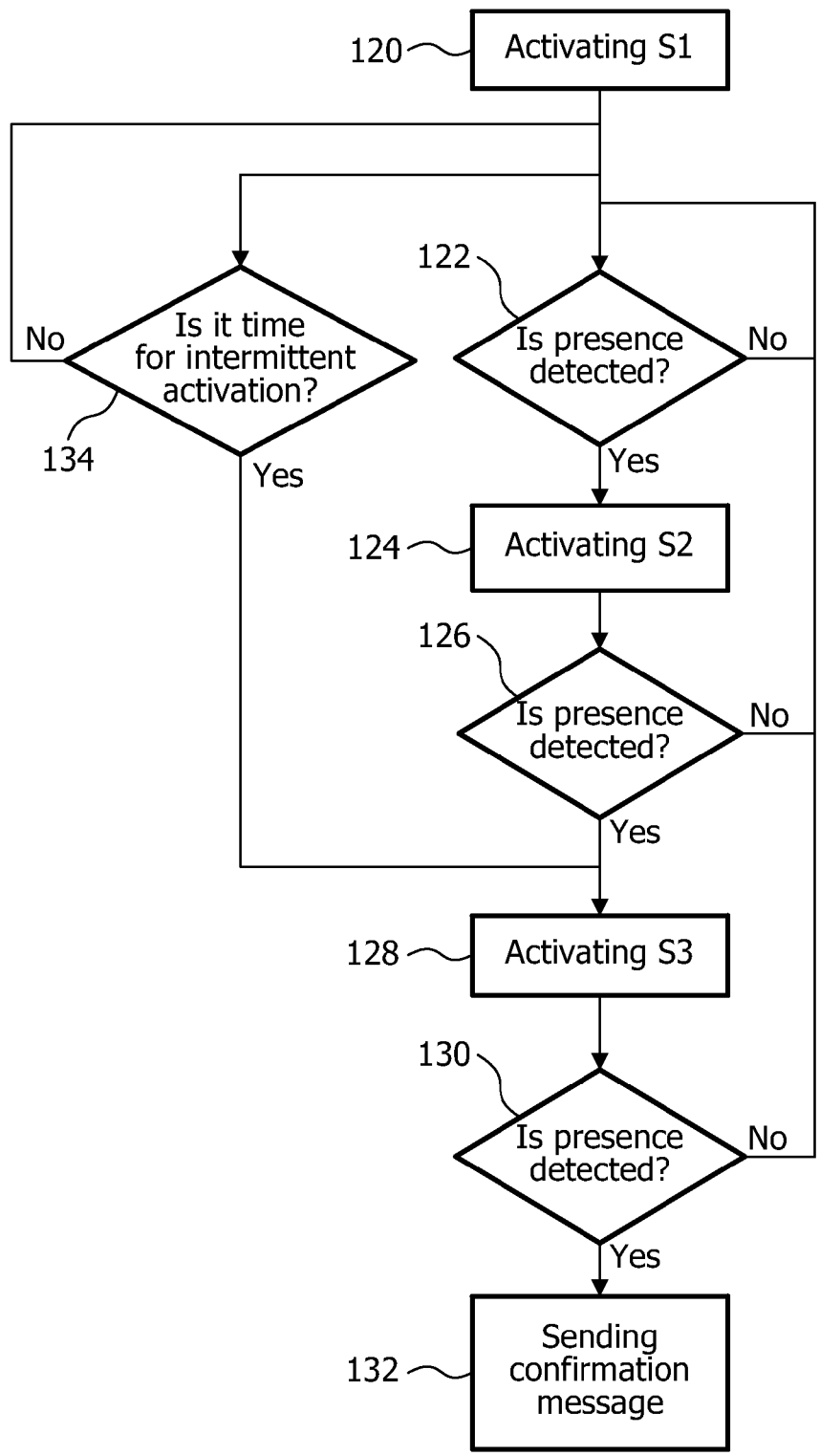
FIG. 3 is a flow chart illustrating an alternative embodiment of the present invention.

FIG. 3 is a flow chart illustrating a second embodiment of the method according to the present invention. The second embodiment corresponds substantially to the one described in conjunction with FIG. 2. Thus, steps 120-132 are identical with steps 100-112 in FIG. 2 and are therefore not described again. However, the second embodiment also includes a step 134, which runs in parallel with the method depicted in FIG. 2. In the first embodiment a subsequent sensor is only activated if a previous sensor has detected presence. As an alternative, a sensor may also be intermittently or randomly activated in step 134. This will be beneficial if the first or second sensor is malfunctioning, giving a false reading or is being tampered with, since the third sensor $s_3$ will be activated with some predetermined frequency, or randomly, even if the previous sensors have not detected presence.

Figure 4:
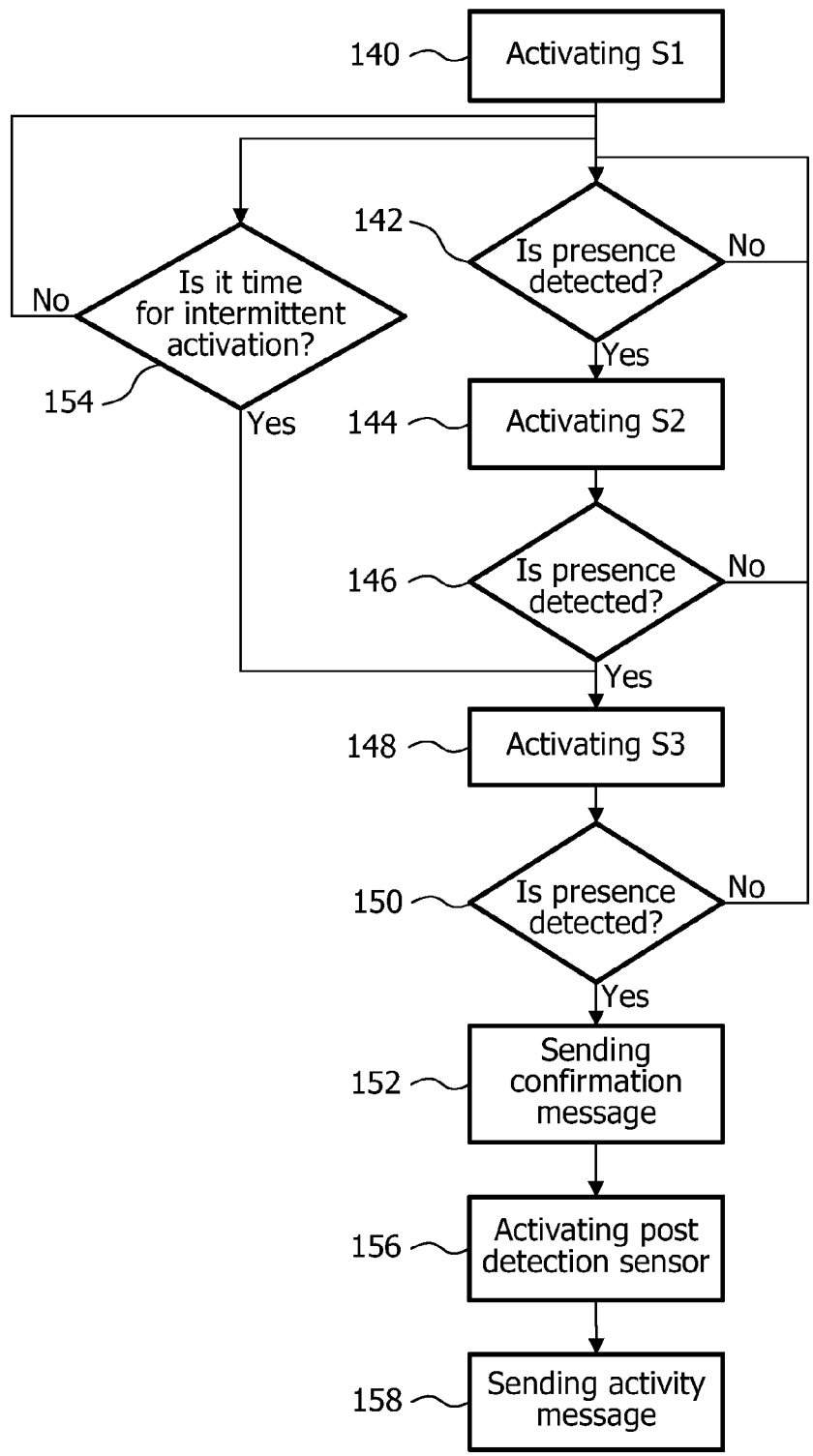
FIG. 4 is a flow chart illustrating another embodiment of the present invention.

Also FIG. 4 shows an embodiment of the method that substantially corresponds to the embodiment shown in FIG. 2 together with the extra step shown in FIG. 3. The steps in FIG. 4 that are the same as in FIGS. 2 and 3 are not described again. The method according to FIG. 4 includes two additional steps, 156 and 158, which are activated after that the confirmation message has been sent. In step 156, the control unit 2 activates a post detection sensor, which gathers information about the object that has been detected by the previous sensors. Thus, it gathers information about the activity going on in the space where the system for detecting presence is set up. In step 158, a report of this activity is sent to a suitable output device.

It should be understood that it also would be possible to add step 156 and 158 directly to the method shown in FIG. 2, without the intermittent step 154.

Although the present invention has been described above with reference to specific embodiments, it is not intended to be limited to the specific form set forth herein. Rather, the invention is limited only by the accompanying claims and, other embodiments than the specific above are equally possible within the scope of these appended claims. As an example the present invention may also be deployed as a complete system or as one or more modules.

In the claims, the term "comprises/comprising" does not exclude the presence of other elements or steps. Furthermore, although individually listed, a plurality of means, elements or method steps may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc do not preclude a plurality. Reference signs in the claims are provided merely as a clarifying example and shall not be construed as limiting the scope of the claims in any way.

The invention claimed is:

1. A system for detecting an object in a predefined space, comprising:
    a first sensor configured to detect the object in the predefined space; and
    a second sensor configured to detect the object in the predefined space, wherein the second sensor is deactivated until the first sensor has detected the object in the predefined space, wherein a deactivated second sensor consumes less energy than an activated second sensor;
    a third sensor configured to detect the object in the predefined space, wherein the third sensor is deactivated until the second sensor has detected the object in the predefined space, wherein a deactivated third sensor consumes less energy than an activated third sensor;
    a control unit configured to: (i) activate the second sensor in response to the first sensor detecting the object, (ii) deactivate the first sensor in response to the activation of the second sensor, (iii) activate the third sensor in response to the second sensor detecting the object, (iv) deactivate the second sensor in response to the activation of the third sensor, and (v) intermittently activate for a predetermined amount of time at least one of the second and third sensors, even if the first sensor has not detected the object in the predefined space; and
    an output device in communication with the control unit, the output device configured to send a message indicating detection of the object in the predefined space only in response to detection of the object in the predefined space by the third sensor;
    wherein the first, second, and third sensors are ordered according to their respective consumption of energy such that the first sensor consumes the least amount of energy when activated, and the third sensor consumes the greatest amount of energy when activated.

2. The system of claim 1, wherein the first sensor includes a passive infrared detector (PID) for detecting a motion of the object in the predefined space, wherein the second sensor includes an ultrasonic sensor for detecting a presence of the object in the predefined space, and the third sensor includes a video camera.

3. A system for detecting an object in a predefined space, comprising:
 a cascade of sensors including at least a first sensor, a second sensor, and a third sensor, each sensor, when activated, configured to detect the object in the predefined space and when activated consumes more energy than when deactivated;
 a control unit configured to: (i) activate the second sensor in response to the first sensor detecting the object, (ii) deactivate the first sensor in response to the activation of the second sensor, (iii) activate the third sensor in response to the second sensor detecting the object, (iv) deactivate the second sensor in response to the activation of the third sensor, and (v) intermittently activate for a predetermined amount of time at least one of the second and third sensors, even if the first sensor has not detected the object in the predefined space; and
 an output device in communication with the control unit, the output device configured to send a message indicating detection of the object in the predefined space only in response to the third sensor detecting the object;
 wherein the first, second, and third sensors are ordered according to their respective consumption of energy such that the first sensor consumes the least amount of energy when activated, and the third sensor consumes the greatest amount of energy when activated.

4. The system of claim 3, further comprising:
 a post-detection sensor for analyzing motion of the object.

5. The system of claim 3, wherein the cascade of sensors includes at least one active sensor and at least one inactive sensor.

6. A method for detecting an object in a predefined space by a cascade of sensors including at least a first sensor, a second sensor, and a third sensor, comprising:
 detecting the object in the predefined space by the first sensor;
 activating, in response to the detecting, the second sensor for detecting the object;
 deactivating the first sensor in response to the activation of the second sensor, wherein the second sensor consumes more energy for the detection than the first sensor;
 activating the third sensor in response to the second sensor detecting the object;
 deactivating the second sensor in response to the activation of the third sensor;
 sending, in response to detection of the object in the predefined space by the third sensor, a message indicating detection of the object in the predefined space; and
 intermittently activating for a predetermined amount of time at least one of the second and third sensors, even if the first sensor has not detected the object in the predefined space;
 wherein steps of the method are performed by a control unit;
 wherein the first, second, and third sensors are ordered according to their respective consumption of energy such that the first sensor consumes the least amount of energy when activated, and the third sensor consumes the greatest amount of energy when activated.

7. The method of claim 6, wherein the third sensor is an ultimate sensor in the cascade of sensors.

8. The method of claim 6, wherein the cascade of sensors includes at least one active sensor and at least one inactive sensor.

* * * * *